United States Patent

[11] 3,558,078

| [72] | Inventor | Andre Lanzaro |
| | | Berkeley, Calif. |
| [21] | Appl. No. | 662,130 |
| [22] | Filed | Aug. 21, 1967 |
| [45] | Patented | Jan. 26, 1971 |
| [73] | Assignee | Whittaker Corporation |
| | | Los Angeles, Calif. |
| | | a corporation of California |

[54] SPACE VEHICLE ATTITUDE CONTROL
8 Claims, 13 Drawing Figs.

[52] U.S. Cl. ...................................... 244/1, 244/3.18
[51] Int. Cl. ...................................... B64g 1/00
[50] Field of Search ........................... 244/1, 77, 3.15, 3.18, 3.22

[56] References Cited
UNITED STATES PATENTS
| 3,189,299 | 6/1965 | Garner et al. | 244/1 |
| 3,216,674 | 11/1965 | McLean | 244/1X |
| 3,365,147 | 1/1968 | Wolfe | 244/1 |

Primary Examiner—Fergus S. Middleton
Attorney—Donald E. Nist

ABSTRACT: A system for controlling the attitude of a space vehicle which undergoes both spinning and coning motion wherein first and second gating means are serially coupled to deliver operating power to a thrust producing device mounted on the vehicle to generate a torque for reorienting the vehicle only when both gate means are simultaneously energized. The first gate means is energized by a first sensing device responsive to the spin orientation of the vehicle relative to the desired attitude in order to pass power for actuating the thrust producing device to produce at an appropriate point in the spin orbit an incremental torque tending to reorient the spin axis toward alignment with the desired heading. The second gate means is energized by a second sensing means responsive to the orientation of the vehicle in its coning orbit relative to the desired attitude in order to deliver the power pulses passed by the first gating means to actuate the thrust producing device only during predetermined portions of each coning orbit where the vehicle heading is closest to the desired heading.

SPACE VEHICLE ATTITUDE CONTROL

BACKGROUND OF THE INVENTION

1. Field of the Invention

This invention relates to a simplified system for controlling the behavior of space vehicles, and more particularly to such systems for denutating and correcting the attitude error of elongated vehicles which undergo spinning motion.

2. Description of the Prior Art

For space vehicles that undergo both spinning motion and coning motion, the attitude control system must be made sensitive to the spin and cone positions of the vehicle. Basically there are two major considerations in properly orienting a spinning vehicle. The first is proper phasing of the reaction torques with the sensed errors, and the second is controlling the coning motion while correcting the displacement of the vehicle attitude with respect to a given target or reference. Ideally the system should operate to exert torques on the vehicle both to reduce or eliminate the coning motion and to correct positional displacement from a desired attitude of flight. Some relatively complicated control systems have been employed for sensing the coning and spinning motions of the vehicle so as to properly control the torquing force applied such as by reaction jets.

More recently certain simplified systems have been developed. One of these employs what is popularly known as the Miniguide technique of vehicle attitude control, in which a rate gyro and horizon sensor are coupled to jointly operate a reaction jet to position the vehicle either vertically or horizontally relative to the earth. In such a system, the rate gyro produces an output proportional to the angular velocity of the vehicle about its coning orbit, while an optical sensor generates an output signal proportional to the amount of the earth's horizon within the field of view of a telescope. These signals are processed through appropriate electronics to operate a reaction jet mounted on the vehicle body to correct the vehicle attitude relative to the earth. Another similar prior art system using the sun as a reference is discussed in detail in an article by Jerrel G. Bland and George W. LeCompte entitles "Simply Mechanized Attitude Control for Spinning Vehicles" appearing in the Journal of Spacecraft and Rockets, Vol. 1, No. 6, Nov.—Dec., 1964, at pages 593—598. In the Bland and LeCompte system a single optical sensor generates an output signal each time the vehicle is within a desired portion of its coning orbit relative to the sun. The application of this output signal to generate thrusts in a rigidly mounted single axis torquer is delayed for a preset time interval selected in accordance with the presumed spin rate of the vehicle to alternately stop and create coning motion to pitch the vehicle attitude toward the target.

While these two types of systems perform satisfactorily with reasonable success in most instances, they have certain serious limitations. Unless the outputs from the position sensors are properly timed with relation to the spin and the vehicle coning orbit in operating the torquing jets, inherent system delay can result in the generation of torques during undesired portions of the vehicle coning orbit, resulting in even greater coning motion or during undesired portions of the spin resulting in greater attitude error. Since attitude and coning are closely related, both items should be corrected at the same time if possible. Otherwise, correction of attitude may be lost during subsequent denutation and vice versa. In addition, a vehicle attitude control system should be capable of utilization in different types of vehicles in various applications without extensive system modification.

However, successful operation of the Bland and LeCompte system depends on an accurate predetermination of certain characteristics such as moment of inertia and spin rate. These characteristics may have a tendency to vary in certain vehicles, and such systems may require extensive study and modification before they can be used with a new vehicle. Other factors such as proper choice of the time delay in relation to vehicle shape must also be considered. Furthermore, this system is unable to eliminate any initial coning motion and has limited response time.

On the other hand, Miniguide systems have excessive fuel consumption since thrust is often required for the rate damping of nutation and fast pitchovers require high thrust levels and correspondingly high fuel consumption due to an inherent system property which tries to damp coning motion while at the same time inducing high rates for the pitchover, which in turn induce coning motion. Also, telescope configuration and design must be adjusted to the operating altitude.

SUMMARY

In brief, the present invention provides a vehicle control system which gates the generation of corrective thrust from a fixed thrusting jet as a function of both angular position in the spin orbit and angular position in the coning orbit relative to the desired attitude of flight. A first sensor is coupled to operate a first gating device or switch to produce thrust each time the spinning vehicle assumes an angular position whereby the generation of thrust at that position tends to correct the vehicle attitude error. A second sensor is coupled to a second gating device or switch that is serially connected with the first to override the effect of the first gate and inhibit the generation of thrust unless the vehicle is within a predetermined portion of its coning orbit where the thrust also tends to reduce coning motion. The system thus ideally can be used to prevent the generation of thrust to correct attitude error in situations where the thrust would also act to increase coning motion. The first and second sensors may be made responsive to a single attitude reference which may be internal, such as a gyroscopic inertial platform or a fixed external reference such as the sun.

One preferred embodiment of the invention, in which the sun serves as an external attitude reference, employs two conventional solar sensor arrangements. One has an elongated slit aperture through which the radiant energy from the sun passes to produce an output signal for operating a reaction jet to produce a thrust each time the desired angular position of the vehicle in its spin orbit is reached. The second solar sensor arrangement, commonly referred to as a conical sensor, generates a sinusoidal output signal in accordance with the angular displacement of the vehicle from the sun. Appropriate electronic circuitry responds to such sinusoidal signal to inhibit the generation of thrust whenever the phase of such signal indicates that the vehicle is within the unselected portion of the coning orbit.

Alternatively, the invention may be employed with an internal reference, such as may be established by an inertial reference system. In this case, the system might employ rate gyro to sense the coning motion and a rate integrating unit or position sensing gyro to establish attitude error.

BRIEF DESCRIPTION OF THE DRAWINGS

The novel features of the invention, as well as the invention itself, both as to its organization and method of operation, may best be understood when considered in the light of the following description of a preferred embodiment, when taken in connection with the accompanying drawings, in which.

DESCRIPTION OF THE PREFERRED EMBODIMENTS

A space vehicle may undergo a variety of different motions as a result of applied forces, among which are those commonly known as pitch, yaw and roll motions. Frequently a roll or spinning motion is imparted to a space vehicle, particularly one with a relatively elongated shape, to cause rotation about the longitudinal axis. This spin affords a degree of gyroscopic stability to maintain axial alignment and prevent tumbling. However, this spinning motion when combined with forces applied transverse to the spin axis results in its moving in a conical orbit. This conical motion of the longitudinal axis is commonly referred to as nutation or coning motion.

Figure 1:
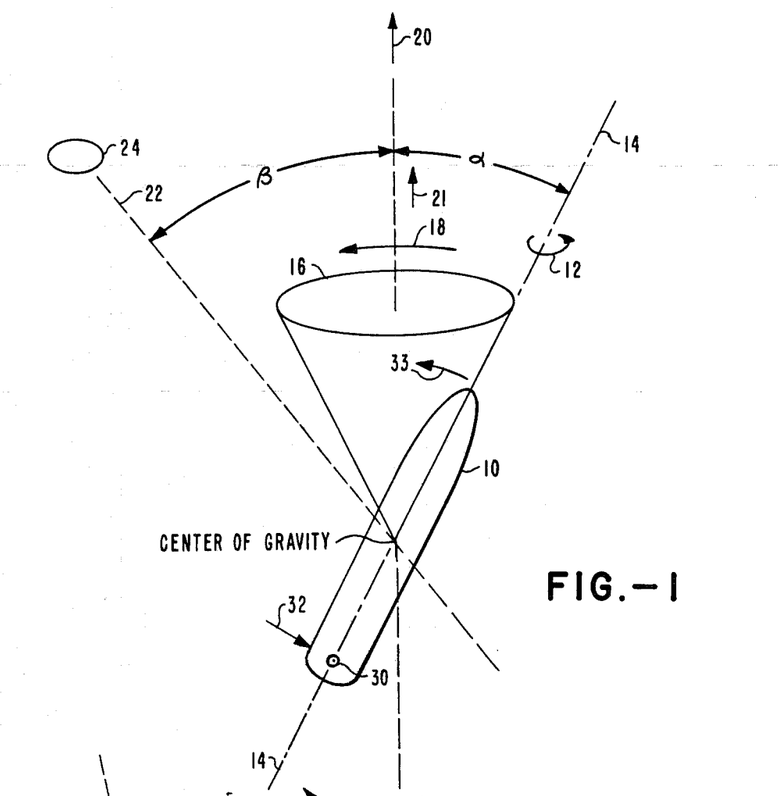
FIG. 1 is may diagrammatic illustration demonstrating the characteristic motions of a spinning space vehicle; DRAWINGS

Referring now to FIG. 1, which schematically illustrates the motion pattern of a spinning vehicle, a vehicle 10 which has an elongated cigar shape spins in a direction of the arrow 12 about its longitudinal axis 14. The vehicle 10 undergoes nutation or coning motion with the axis 14 rotating in a direction shown by the arrow 18 to describe a cone 16. The central axis 20 of the cone 16 represents the present means heading of the vehicle 10, which may correspond to the desired direction of travel with the vehicle 10 moving along the axis 20 in the direction shown by the arrow 21. The amplitude of the coning motion is represented by an angle $\alpha$ is the angle between the cone axis 20 and surface of the cone 16. The line of sight 22 between the vehicle 10 to an external reference body 24 establishes an attitude reference which as here usually corresponds to the desired heading of the vehicle 10. The reference body 24 may be an external body such as the earth, or any selected stellar body. Alternatively, the line 22 may be established relative to an internal reference such as an inertial platform within the vehicle 10. The attitude of the vehicle 10 is incorrect to the extent that the present mean heading which corresponds with the axis 20 deviates from the desired heading 22, the difference therebetween being represented by an angle $\beta$.

An effective attitude control system for the vehicle 10 is one which simultaneously reduces the angles $\beta$ and $\alpha$ toward zero as quickly as possible. In other words, the heading 20 is changed to coincide with the desired heading 22 and the cone 16 at the same time gradually reduced to a straight line coincident with the heading 20. It should be understood that the desired heading 22 depicted in FIG. 1 has been chosen for illustrative purposes only and need not be directed toward the reference body 24. Thus it could be that the desired direction 22 of vehicle travel might be directly away from or at some fixed angle relative to the reference body 24; however, in this case the vehicle must be oriented with respect to two references. The reference body 24 simply provides a fixed point in space which can be used as desired to control the attitude of the vehicle 10.

The control system of the present invention utilize a pair of sensors responsive to a single reference. The reference may be one internal to the vehicle, such as an inertial platform, or it may be an external reference, such as the celestial body 24 depicted in FIG. 1. An understanding of one preferred embodiment of the invention utilizing the sun as the reference may be had with reference to FIGS. 2 and 3.

In FIG. 1 the vehicle 10 has a reaction jet nozzle 30 mounted in a fixed position toward the rear behind the center of gravity. Timing of the jet expels gases at high speed from the nozzle 30 which is oriented to produce a reaction force radially with respect to the longitudinal axis 14 of the vehicle. This reaction force generates a torque, as shown by the arrow 32, at 90° from the applied force in the direction of spin, as shown by the arrow 12. This torque produces a change in the angular momentum of the vehicle 10 tending to rotate its axis 14 about its center of gravity in the direction of the arrow 33. Since the nozzle 30 rotates about the vehicle axis 14 at the spin rate, the direction of the torque that would result from firing the reaction jet constantly changes. At the same time, the alignment of the vehicle axis 14 may be undergoing constant cyclic change due to nutation or coning motion. Therefore, to produce a desired change in the vehicle heading, firing of the reaction jet must be properly timed relative to these motions so that the nozzle 30 points in the appropriate direction for producing the necessary torque. An applied torque may either increase or decrease nutation or coning motion (the angle $\alpha$) depending on the instantaneous position of the vehicle in its coning orbit, while an applied torque may either increase or decrease attitude error (the angle $\beta$) depending on the direction of nozzle 30 during a spin cycle relative to the desired heading. Thus a torque that would decrease coning motion might increase attitude error, and vice versa. For example, firing of the reaction jet with the nozzle 30 and vehicle 10 in the position shown in FIG. 1 would both reduce attitude error and increase coning motion. On the other hand, if the jet were fired with the nozzle 30 outward as shown in FIG. 1, but with the vehicle axis 14 on the opposite side of the cone orbit 16 from that shown, the resulting torque would be directed toward the desired heading 22 moving the cone axis 20 closer to the vehicle axis. Thus the cone size would be decreased, while the attitude error angle $\beta$ would also decrease. It is therefore desirable that the nozzle 30 be permitted to fire only when either coning or attitude error are decreased without increasing the other, and preferably when both are decreased.

Figure 2:
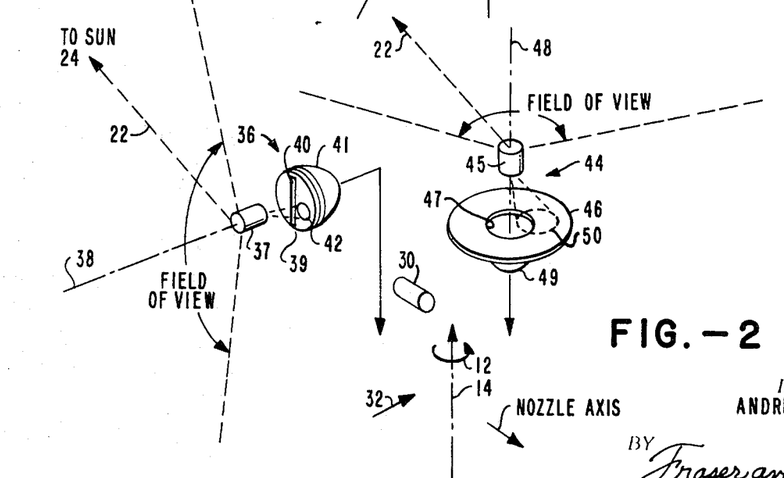
FIG. 2 is a schematic perspective illustrative of solar sensing arrangements for use in a preferred embodiment of an attitude control system which utilizes an external reference body in accordance with the present invention.
Figure 3:
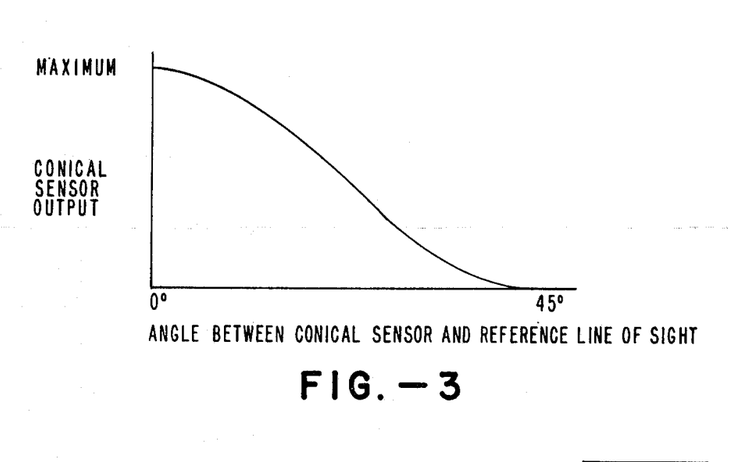
FIG. 3 is a generalized graphical representation of the signal response of the conical reference sensor of FIG. 3 with signal amplitude plotter as a function of the angle of attitude error.

Referring now to FIGS. 2 and 3, attitude control systems in accordance with the present invention operate to control firing of the reaction jet through the nozzle 30 in accordance with the orientation of the torque axis 32 relative to the system reference, which in this instance constitutes an external reference such as the sun, earth or other celestial body. In the particular embodiment illustrated, the sun 24 serves as the external reference, and a conventional slit solar sensor arrangement 36 is employed in determining the relative orientation of the torque axis 32.

As shown, the slit solar sensor arrangement 36 may consist of an optical telescope 37 preferably having a wide angle field of view approaching 180° with its optical axis perpendicular both to the longitudinal axis 14 of the vehicle and the axis of the nozzle 30 which corresponds to the direction of the reaction jet thrust. An image of the telescope field of view is focused on an opaque mask 39 containing an elongated slit opening 40 aligned parallel with the vehicle axis 14. A photocell 41 located behind the opaque mask 39 is sensitive to solar radiation focused by the telescope 37 through the elongated slit 40. Thus the mask 39 restricts the response of the photocell 41 to a narrow radial section of the field of view which is substantially perpendicular to the nozzle axis and the direction of reaction jet thrust. The slit solar sensor arrangement 36 is fixedly mounted on or within the body of the vehicle 10 in an appropriate location permitting the desired field of view. As the vehicle 10 spins about its longitudinal axis 14, the focused radiation from the sun image 42 produced by the telescope 37 passes through the slit 40 to energize the photocell 41 only when the optical axis of the telescope 37 is radially aligned with the sun. In the illustration of FIG. 2, the sun 24 presumably lies in the plane of the drawing approximately 30° removed from radial alignment with the optical axis 38 of the telescope 37, and thus the sun image 42 is shown as being focused on the opaque portion of the mask 39. Subsequently, as the spin rotates the vehicle 10 in the direction shown by the arrow 12 through approximately 330° of arc, the telescope 37 moves into substantial radial alignment with the sun 24 relative to the vehicle spin axis 14. In this position, the optical axis 38 of the telescope is substantially in the same radial plane as the line of sight 22 to the sun so that the sun image 42 is focused through the slit 40 to energize the photocell 41. Since the sensitive axis of the solar sensor arrangement 36 is made radially perpendicular to the direction of thrust produced by the reaction jet and thus parallel to the resulting torque vector 32, firing of the reaction jet in this position has the effect of rotating the vehicle axis 14 toward the sun 24. In designing the particular slit solar sensor to be used, the width of the slit 40 may be varied relative to the size of the reference body image 42 produced by the telescope optics to vary the radial extent of the response. Although such conventional slit sensors are preferred for most applications, any other suitable arrangement may be employed for similarly determining the spin position of the vehicle.

In addition, the attitude control system of this invention employs a conventional conical solar sensing arrangement 44 for determining cyclical variation of the vehicle heading relative to the external reference due to coning motion. A telescope 45 preferably with a wide angle field of view has its optical axis aligned parallel with the longitudinal axis 14 of the vehicle 10. In the particular arrangement illustrated, the entire field of view is focused on an opaque mask 46 having a circular opening 47 that is centered with respect to the optical axis 48 of the telescope. A photocell 49 located behind the opaque mask 46 is energized by solar radiation passing through the circular opening 47 and produces an output signal proportional to the total amount of impinging radiation. Preferably the optics of the telescope 45 are selected to produce an image 50 of the sun 24, or other reference body, of approximately the same size as the circular opening 47 in the mask 46, so that when the external reference body is exactly aligned with the optical axis 48 of the telescope, maximum radiation reaches the photocell 49 to produce a maximum output signal. On the other hand, the amount of energy focused through the opening 47 decreases proportionally as the angle between the optical axis 48 and the reference body increases since only a portion of the image 50, as shown in the illustration of FIG. 2, passes through the opening 47 to energize the photocell 49. Thus, if the vehicle 10 is undergoing nutation or coning motion, the signal output from the photocell 49 reaches a maximum at that point in the coning orbit when the optical axis 48 of the telescope 45, which is in this case disposed parallel to the vehicle axis 14, forms the smallest angle with the direct line of sight 22 to the sun 24. It will be recognized by those skilled in the art that the conical sensor employed for this purpose may take various forms depending upon the nature of the external reference. Preferably the conical sensor arrangement employed should have a signal output characteristic similar to that shown in FIG. 3, in which the magnitude of the output signal gradually decreases as the angle of attitude error increases.

Figure 4:
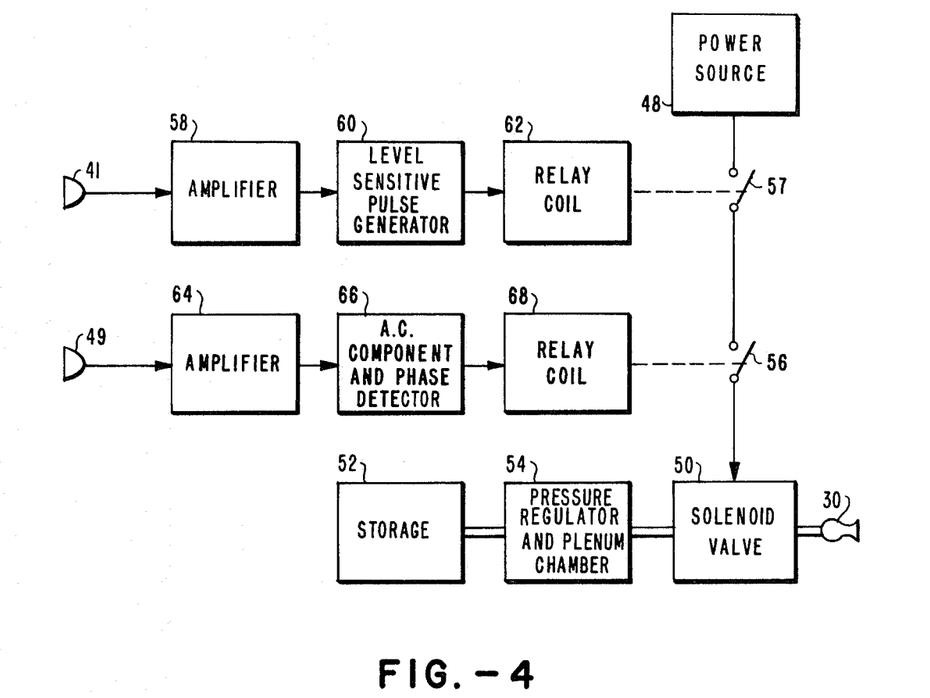
FIG. 4 is a simplified block diagram of one form of an external reference control system in accordance with the invention for use with the solar sensing arrangements of FIG. 2.

Referring now to FIG. 4, a simple gating switch arrangement may be used in accordance with the invention to control operation of the reaction nozzle 30 to produce thrust whenever a nozzle power switch 50 is energized by a flow of electrical power from a source 48 through two serially connected switches 56 and 57. In this case, for purposes of illustration, the reaction jet is gas operated to deliver pressurized gas from a cold gas storage 52 through a pressure regulator and plenum chamber 54 to the nozzle power switch 50 to be exhausted through the nozzle 30. Of course, the basic control system may be adapted to any suitable reaction jet arrangement. The switches 57 and 56 which are serially connected between the power source 48 and the nozzle power switch 50 are relay operated in accordance with the output signals from the slit solar sensor arrangement 36 and the conical solar sensor arrangement 44, respectively. The output signal from the slit solar sensor photocell 41 is amplified by an appropriate amplifier 58 to be applied to a level sensitive pulse generator 60. Wherever the magnitude of the amplified output signal from the photocell 41 exceeds a preset level, the level sensitive pulse generator 60 supplies an output current pulse to energize a relay coil 62 which acts to close the associated switch 57. The level sensitive pulse generator 60 preferably is of the type which continues to supply current to the relay coil 62 so long as the amplified photocell output remains above the selected preset level so that the total corrective torque produced during firing of the reaction jet is symmetrical with respect to the plane of rotation necessary to bring the vehicle to the desired heading independent of slow variations in the vehicle's spin rate. On the other hand, the output signal from the conical solar sensor photocell 49 of the conical solar sensor arrangement 44 is amplified by an appropriate amplifier circuit 65 to be applied to an AC component and phase detector circuit 66. This circuit 66 functions to produce an output current pulse for energizing a relay coil 68 to close the normally open switch 56 only during the time that the amplified photocell output signal has a negative slope and is thus decreasing in magnitude.

Figure 5A:
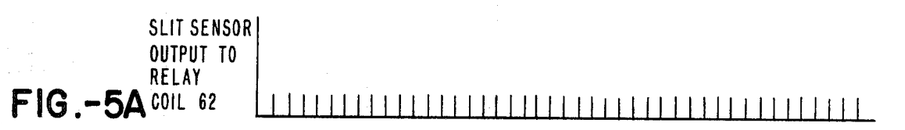
FIG. 5A is a graphical representation of the output signal of the slit solar sensor of FIG. 2 shown as a function of time in a vehicle undergoing coning motion as shown in FIG. 1.

The operation of the circuit in serially gating energizing power through the switches 56 and 57 is shown by FIGS. 5A through 5D in which the signals generated at various points in the circuit of FIG. 4 are shown related to a common horizontal time scale. FIG. 5A illustrates a regular series of short duration pulses generated at the output of the level sensitive generator 60. The time period between pulses corresponds to the interval required for the vehicle to complete a full spin cycle. One of these short duration pulses is generated by the action of the slit solar sensor arrangement 36 each time the spin position of the vehicle 10 is such that the reaction jet may be fired to translate the vehicle axis 14 toward the desired direction of flight 22.

Figures 5B, 5C, 5D:
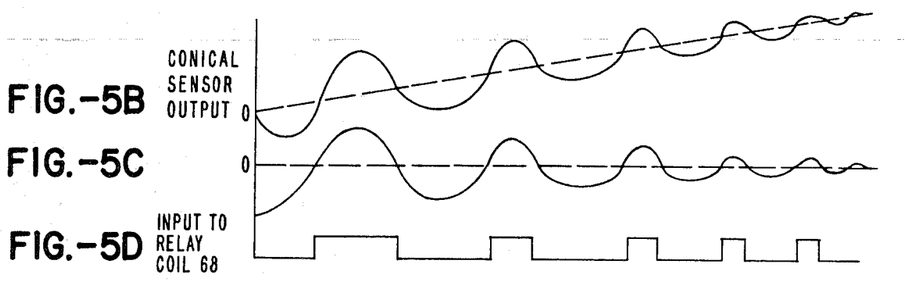
FIG. 5B is a graphical representation of the output signal of the conical solar sensor of FIG. 2 shown as a function of time in a vehicle undergoing coning motion as shown in FIG. 1.
FIG. 5C illustrates the alternating current component of the conical solar sensor output shown in FIG. 5B.
FIG. 5D is a graphical representation of the gating signal derived from the output signal of the conical solar sensor of FIG. 2 shown as a function of time.

Referring to FIG. 5B, the waveform shown illustrates a typical output waveform from the photocell 49 of the conical solar sensor arrangement 44 under conditions in which the vehicle 10 is originally undergoing a substantial coning motion with its means heading along the central cone axis 20 displaced from the desired heading which in this case coincides with the line of sight 22 to the sun 24. Under these condition, the output signal waveform from the conical solar sensor photocell 49 is roughly sinusoidal with the mean valve increasing as the mean heading 20 moves toward the line of sight 22. The amplitude of the cyclical variations in the amplitude of the waveform are decreasing as the coning motion is decreased by the system. During each roughly sinusoidal cycle the amplitude of the output signal is a maximum when the vehicle 10 is at the position in its coning orbit where the angle between its longitudinal axis 14 and the line of sight 22 to the sun 24 is a minimum, whereas the signal amplitude is a minimum when the vehicle 10 is in the directly opposite position on the other side of the coning orbit.

Figure 5E:
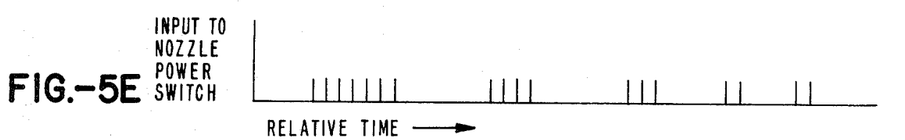
FIG. 5E is a graphical representation of the input signal provided to the nozzle power switch of FIG. 2 shown as a function of time.

This photocell signal is applied to the AC component and phase detector 66, which may contain appropriate circuitry for filtering out the DC component of the waveform shown in FIG. 5B. This results in an alternating current signal, as shown in FIG. 5C, having a roughly sinusoidal wave-shape that gradually decreases in amplitude as the vehicle coning motion decreases. It should be noted that the waveform of FIG. 5C has the same phase as the sinusoidal amplitude variations of the photocell output shown in FIG. 5B, which means that the AC component detector or DC filter circuitry employed results in no phase shift in the sinusoid. With no phase shift, the alternating current signal of FIG. 5C can be used directly to actuate the relay coil 68 to close the gating switch 56. As shown in FIG. 5D, the relay coil 68 is energized to close the gating switch 56 only during the time that the AC component derived from the output signal of the conical sensor, as shown in FIG. 5C, is positive. This corresponds to the interval during which the vehicle 10 is located in that half of its coning orbit nearest the desired heading. Closure of the switch 56 then permits application of actuating power pulses from the source 48 to the nozzle power switch 50, as shown in FIG. 5E, each time the other gating switch 57 closes momentarily under control of the slit solar sensor arrangement during this interval. Thus, the reaction jet is permitted to produce torque pulses only when the vehicle axis is on the side of its coning orbit towards the sun target.

Figure 6:
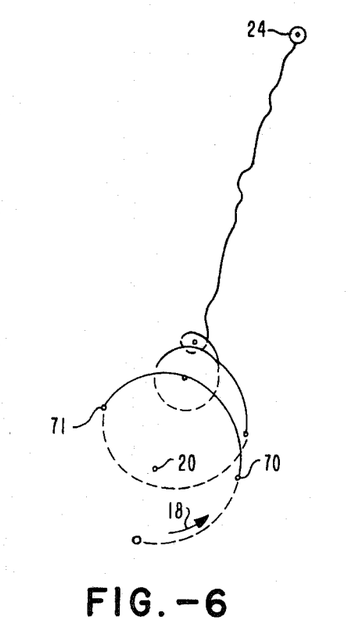
FIG. 6 is a diagrammatic representation of vehicle trajectory relative to an external reference body as provided by the arrangements of FIG. 4.

Referring now to FIG. 6, the effect of this dual gating action of the invention in simultaneously reducing both attitude error and coning motion is demonstrated by the illustration of a typical path traced by the vehicle axis 14 on a plane a unit distance away from the vehicle 10 and normal to the line of sight 22. In accordance with this illustration, the vehicle 10 is originally assumed to be undergoing a counterclockwise coning motion in the direction of the arrow 18 about the cone axis 20 which corresponds to the mean direction of heading. The path described by the vehicle axis 14 is shown beginning at that point in its coning orbit where the instantaneous attitude error is greatest. At this time the output signal from the conical sensor arrangement is at a minimum so that the switch 56 is held open to prevent firing of the reaction jet 30. The vehicle axis 14 continues to describe a circular path as indicated by the dashed line curve until it reaches a point 70 at approximately the beginning of that half of the coning orbit nearest the sun 24. At this point, the output signal from the conical solar sensing arrangement 44 causes the gating switch 56 to close to permit firing of the reaction jet 30 whenever the other gating switch 57 is closed by the action of the slit solar sensor arrangement 36. The reaction jet 30 is thus permitted to fire several times, assuming a cigar-shaped vehicle where spin rate is at least several times its coning rate, as the vehicle axis 14 traces out the solid line portion of the path toward point 71.

On each firing the reaction jet produces an incremental thrust to produce a torque tending to displace the vehicle axis 14 toward the sun target 24. However, the gyroscopic character of the spinning vehicle 10 prevents an instantaneous reorientation of vehicle spin axis 14. Thus, in accordance with general gyroscopic principles the applied torque produces a change in the transverse angular momentum that displaces the total angular momentum vector. This change of angular momentum may be represented by an incremental change vector $\Delta n$ parallel to the torque vector 32. As may best be understood by reference to the illustration of FIG. 7, the incremental change in angular momentum produced by firing the reaction jet in this portion of the coning orbit results in an incremental angular shift in the direction of the total angular momentum vector which corresponds to the coning axis 20, toward the sun 24.

Figure 7:
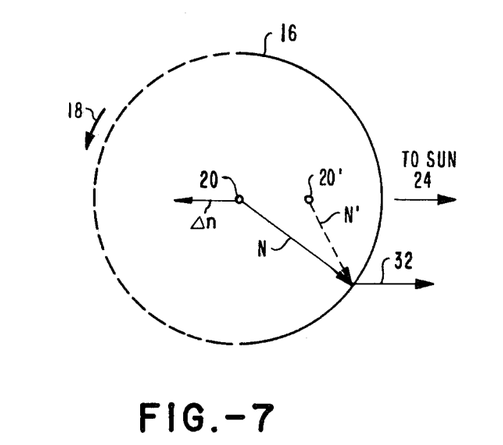
FIG. 7 is another diagrammatic representation showing the effect of a thrust produced by the system of the invention on attitude error and coning angle.

Referring to FIG. 7, a single circular coning orbit is shown in which the solid line half toward the sun 24 represents that portion where the gating switch 56 is closed to permit firing of the reaction jet and the dotted line half away from the sun 24 represents that portion of the orbit where the gating switch 56 is held open to prevent reaction jet firing. Prior to firing of the reaction jet, the existing coning motion is represented by a nutation vector N which corresponds to the transverse component of the instantaneous angular momentum and rotates about the coning orbit 16 with a constant angular velocity. With the vehicle 10 in the position in its coning orbit represented by the position of the vector N, assume the reaction jet 30 fires to produce an incremental torque 32 tending to rotate the spin axis of the vehicle toward the sun 24. However, since the axis 14 can not change position instantaneously, the torque 32 creates an incremental nutation vector $\Delta n$ that is equal and opposite to the applied torque vector 32. The total angular momentum vector is shifted to a new position 20' which results in a new nutation vector N' equal to N+$\Delta n$ which is smaller than the original nutation vector N. Conversely, the application of this torque vector with the nutation vector N in the opposite half of the nutation orbit away from the sun 24 would result in a shift of the total angular momentum vector 20 in the opposite direction, thus producing an increased nutation vector and coning motion. The immediate effect of the applied torque 32 is thus to establish a new coning orbit of decreased magnitude N' and an immediate repositioning of the cone axis 20 in the direction of the applied torque 32 to 20'. Thus, the amplitude of the coning motion is reduced at the same time that the mean heading of the vehicle, as represented by the cone axis 20, is shifted toward the desired target.

As will be evident to those skilled in the art, this invention is capable of simultaneously reducing both attitude error and coning motion of any of a variety of operating modes which may be selected to suit a particular application. For example, the operation of the gating switch 56 by the conical solar sensor arrangement 34 need not be precisely limited to the sun half of the coning orbit to produce the desired effect. This permits use of relative simple circuitry for this purpose. Generally, the switch 56 may be operated to permit firing of the reaction jet 30 during different selected portions of the nutation cycle so long as the firing of the reaction jet results in a net reduction during each cycle in the magnitude of the nutation vector. A net decrease of the coning orbit can be achieved so long as the average attitude of the vehicle during the selected portion of each coning orbit during which firing is permitted contains a substantial directional component toward the sun side of the orbit. Of course, for maximum efficiency and speed in reducing both attitude and coning motion, the selected arc should be centered with respect to the point in the coning orbit closest to the sun where the attitude error is a minimum so that the mean vehicle attitude during the selected portion is aligned with the radial direction toward the sun. Obviously, maximum speed in eliminating coning is obtained by limiting the selected arc to only those angles where a thrust would reduce the nutation vector N, which would be slightly less than a full semicircle.

As shown in FIG. 6, once the initial coning motion of the vehicle 10 has been sufficiently reduced, the system operates to produce a steady procession of the vehicle axis 14 in a substantially straight line with negligible nutation amplitude directly towards the sun with torque pulses being continually applied at the vehicle spin rate. Thus, quick elimination of the initial coning motion thereafter permits the subsequent uninterrupted application of torque pulses to correct the remaining attitude error at an increased rate.

Figure 8A:
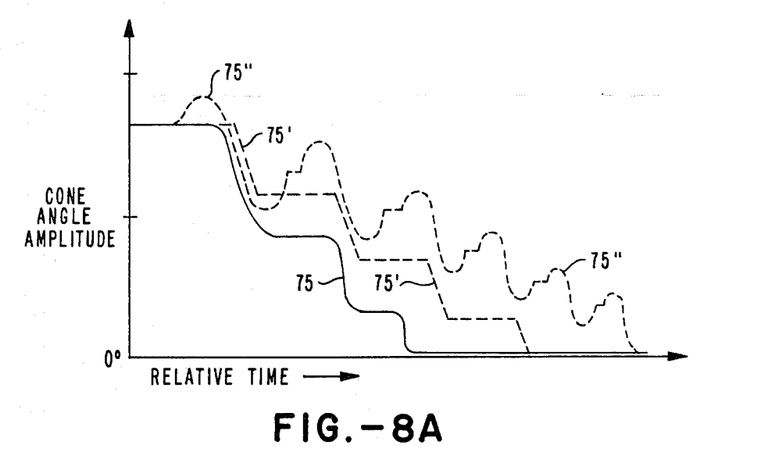
FIG. 8A is a diagrammatic plot of variations of cone angle as a function of time produced by operating the control system in accordance with the present invention in various modes.
Figure 8B:
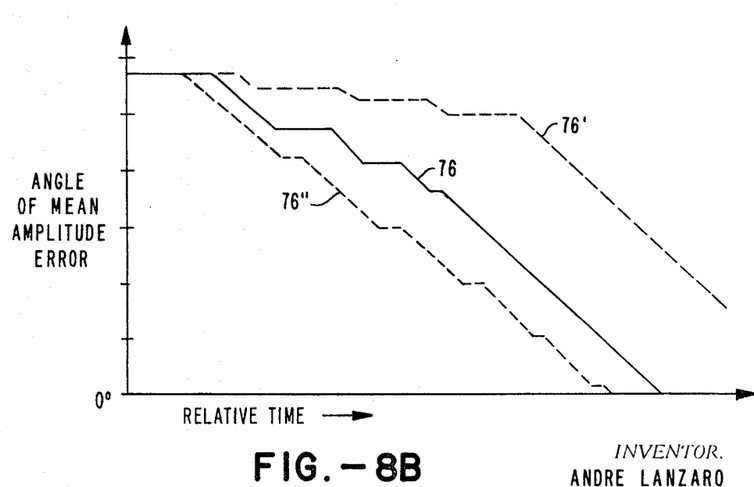
FIG. 8B is a diagrammatic plot of vehicle attitude variations as a function of the same time scale as that of FIG. 8A in the various operating modes.

Referring now to FIGS. 8A and 8B, which contain corresponding diagrammatic plots of variations in cone angle amplitude and mean attitude error angle as a function of a common relative time scale, the relative rates in which coning amplitude and attitude error are reduced by the system of this invention may be selected to suit particular vehicle characteristics and operating conditions. In most instances, the mean attitude error would be substantially larger than the angle of coning motion. Stable alignment in the desired attitude may most quickly be achieved by eliminating the coning error as soon as possible, after which the attitude error is corrected by a continual series of reaction jet thrusts. This mode of operation is generally preferred and is achieved by operating the system as described hereinbefore to permit firing of the reaction jet only when the thrust created also acts to reduce the amplitude of the coning motion.

This generally preferred mode of operation is diagrammatically illustrated by the solid line curve 75 in FIG. 8A, which approximates resulting cone angle amplitude variation, and the solid line 76 in FIG. 8B, which approximates variations in the angle of mean attitude error. During the intervals when the reaction jet is permitted fire, the mean attitude error is illustrated as decreasing at a constant angular rate as if the reaction jet were firing continuously during the entire interval. However, as previously explained, the jet fires in a series of spaced pulses and each firing results in an incremental change. Therefore, it should be understood that for purposes of this illustration the lines 75 and 76 are drawn to represent a smoothed average change over these intervals to simplify the illustration.

Also, it should be noted that the curves of FIG. 8A are shown on an expanded vertical scale in comparison with those of FIG. 8B as shown by the curve 75. The cone angle amplitude decreases relatively slowly at the beginning and after each firing interval with the rate being a maximum at approximately the center of each firing interval when the vehicle 10 is in that position in its coning orbit nearest the sun. As may be seen by reference to FIG. 7, the maximum rate of decrease in the cone angle amplitude would exactly equal the angular rate of change of mean attitude error at this point since the nutation vector N points directly toward the sun and would thus be aligned with the change of nutation vector $\Delta n$ but opposite in direction. Obviously then the rate of angular change in coning amplitude may equal but cannot exceed the angular rate of mean attitude error correction.

In the preferred mode of operation, as shown by the comparison of the curve 75 and 76 taking into account the different vertical angle scales of FIGS. 8A and 8B, the average angular rate of change in cone angle amplitude is slightly more than half of the angular rate of change in mean attitude error. And, since the reaction jet 30 is prevented from firing during roughly half of each nutation cycle, the average angular rate of mean attitude error correction is roughly doubled after coning motion is effectively eliminated.

The dashed line curve 75' and 76' demonstrates another mode of operation in which the angular rate of change of cone angle amplitude is made approximately equal to the angular rate of mean attitude error correction. This is achieved by limiting the firing of the reaction jet 30 to a narrow arc of each nutation cycle during which the vehicle attitude most closely approaches the desired heading, and thus each thrust produces a change in the nutation vector approximately equal to the change in the vehicle attitude. As may be seen by comparison, this mode is slower than the preferred mode in correcting a given amplitude of coning motion or attitude error. However, since the angular rates of change are approximately the same, this alternative mode may be desirable where the cone angle amplitude may not be substantially smaller than the attitude error. Operation in this mode permits the angular rate of coning motion reduction to be maximized with respect to the angular rate of attitude correction so that a relatively large coning motion can be eliminated before a slightly larger mean attitude error is corrected. With this system, the elimination of coning motion prior to complete attitude correction is always desirable.

On the other hand, assuming that the initial attitude error may be much larger than the maximum angle of coning motion, the system may be adapted to operate in another alternative mode as demonstrated by the curves 75'' and 76'' of FIGS. 8A and 8B. This mode of operation is accomplished by permitting firing of the reaction jet 30 for more than a half cycle of coning motion, such as by leaving only a small arc directly opposite the sun side of the cone in which the gating switch 56 would be held open to prevent firing. This results in a longer firing interval but a slower decrease in coning motion. As shown by the curve 75'', the reaction jet firing increases the cone angle amplitude during the initial and final portions of each firing interval, but results in a small net decrease in cone angle amplitude during each coning cycle. As seen by comparison of curve 75'' for this mode of operation with the curve 75 and 75', the total time required to eliminate a given cone angle amplitude is increased, but since the reaction jet 30 is firing a greater portion of each coning cycle, the attitude error is being corrected more quickly.

Accordingly, systems in accordance with this invention are capable of being adapted to operate in a selected mode best suited to a particular vehicle characteristic and condition of operation by selecting the appropriate phase of the AC component of the photocell output signal from the conical solar sensor arrangement 44. In addition, the system may be seen to operate satisfactorily within wide limits to simultaneously reduce both coning motion and attitude error without the necessity of precise sensing and signal handling circuitry. As a result, relatively simple electronic circuit arrangements can be used for achieving the desired ends. For example, the AC component and phase detector 66 might consist of a simple circuit arrangement using a capacitive coupling to eliminate the DC component of the photocell output and a diode for passing the positive portion of the remaining AC component to operate the relay coil 68. However, it would be necessary to maintain the approximate phase relationship with the original photocell output in feeding the positive portion of the AC signal to operate the relay coil 68.

Accordingly, it may be seen that the mechanization of the entire improved system of this invention to operate with the external solar reference may be extremely simple and inexpensive. More sophisticated optical sensor arrangements would necessarily have to be employed where the external reference were a star instead, but these complications are inherent in the selection of the reference body.

As previously mentioned, the system may be employed with an internal reference such as might be established by an inertial guiding system; however, as a practical matter, an external optical reference would usually be preferred since most gyroscopic inertial references are relatively expensive and complicated. Nevertheless, such an internal reference might be employed if a suitable reference were not available or if the vehicle already included basic inertial guidance which could be supplemented with relative ease for operation with this system. Typically this would require the addition to a basic inertial reference platform of a rate gyro to sense coning period and a rate integrating or position sensing gyro unit to determine the attitude error and generate an error signal in a manner corresponding to the conical solar sensor. This signal could then be gated by appropriate commutation at the spin rate of the vehicle in the manner similar to the slit solar sensor to thus generate thrust properly vectored with respect to the attitude error. Either a stabilized inertial platform or a three-axis stable platform could be used to establish the inertial reference and provide the position error signal needed. A commutator plate oriented by a gyro stabilized unit could be used to gate the firing pulses in accordance with the proper phase of the nutation cycle. The details of such a system using an internal inertial reference will not be illustrated or further described herein since they are not necessary to an understanding of the invention and may easily be mechanized in a variety of different ways by those skilled in the art to operate a system in accordance with this invention.

In addition, while preferred embodiments and modes of operation have been described and illustrated herein to explain the nature of the invention, it will be understood by those skilled in the art that various changes in form and details may be made therein without departing from the spirit and scope of the invention.

I claim:

1. A system for controlling the attitude and coning motion of a spinning space vehicle comprising:
   thrusting means positioned on said vehicle for exerting a thrust in a direction normal to the spin axis whenever energizing signals are received;
   first means responsive to the spin orientation of the vehicle relative to a desired heading for transmitting energizing signals to the thrusting means only during a small angular portion of each spin cycle to produce an incremental torque tending to reorient the spin axis towards the desired heading; and gating means connected in series with said first means and responsive to the instantaneous vehicle attitude relative to the desired attitude for blocking said energizing signals to said thrusting means except during a selected portion of each coning orbit during which the mean direction of the vehicle attitude is directed towards the desired attitude.

2. A system in accordance with claim 1 wherein:

the desired attitude corresponds to the alignement of the spin axis along the line of sight to a fixed external energy radiating body;

said first means includes a first sensing means responsive to energy radiated by said body for transmitting energizing signals to said thrusting means whenever the line of sight lies within a narrow radial sector having an angular extent corresponding to said small angular portion and extending outward from said spin axis, the radial axis of said sector being substantially normal to the radial direction of said thrust and aligned with the direction of the thrust; and said gating means includes second sensing means responsive to the energy radiated by said body for determining cyclical variations in the angle between the spin axis and the line of sight and for blocking said energizing signals to said thrusting means during a selected portion of each said cyclical variation.

3. The system of claim 2 wherein:

the body is an optical source;

said first sensing means is an optical slit sensor including a first photocell, a first optical system for imaging on said photocell, a field of view taken normal to the spin axis and including said radial sector on said photocell, and opaque means defining a relatively narrow elongated transparent aperture disposed between said optical system and said photocell to limit the image reaching the photocell to that portion of the field of the image reaching the photocell to that portion of the field of view corresponding to said radial sector and means responsive to an output signal produced by said photocell when the optical source is imaged thereon for transmitting energizing signals to said thrusting means.

4. The system of claim 3 wherein:

the thrusting means includes a signal energized reaction jet for producing a thrust directed substantially normal to said radial sector; and said first means further includes an energizing signal source and a first switch means responsive to said photocell output connecting said energizing signal source to energize said reaction jet.

5. The control system of claim 4 wherein:

said gating means further includes a second switch means responsive to the output of said second sensing means and connected in series with said first switch means between said energizing signal source and said reaction jet, said second switch means remaining open to block said energizing signals to said thrusting means during a selected portion of each said cyclical variation.

6. The system of claim 5 wherein:

said second sensing means includes a conical optical sensor having a second photocell, a second optical system for imaging the radiation from said body on said second photocell so that the proportion of the optical energy from said body being imaged on said second photocell is in inverse proportion to the angle between the spin axis and the desired attitude, and means responsive to said second photocell output for deriving the alternating current portion of said output and for delivering energizing signals to said second switching means only during the positive portions of the alternating current component of said second photocell output.

7. An attitude control system for selectively controlling the operation of thrusting means mounted on a spinning space vehicle to denutate the vehicle and correct its attitude, the vehicle having a spin axis and a coning orbit about which the spin axis revolves, the control system comprising:

first and second gate means coupled to operate the thrusting means only when both gate means are simultaneously activated;

first means coupled to activate the first gate means whenever the vehicle assumes a predetermined position in the spin cycle; and second means coupled to activate the second gate means whenever the vehicle spin axis lies within a predetermined portion of the vehicle coning orbit.

8. An attitude control system in accordance with claim 7, wherein:

the first and second means are responsive to the same reference.